(12) United States Patent
Park et al.

(10) Patent No.: US 9,116,384 B2
(45) Date of Patent: Aug. 25, 2015

(54) DISPLAY DEVICE

(75) Inventors: Se-Ki Park, Gyeonggi-do (KR);
Tae-Seok Jang, Seoul (KR); Gi-Cherl Kim, Gyeonggi-do (KR)

(73) Assignee: SAMSUNG DISPLAY CO., LTD., Yongin, Gyeonggi-Do (KR)

(*) Notice: Subject to any disclaimer, the term of this patent is extended or adjusted under 35 U.S.C. 154(b) by 1262 days.

(21) Appl. No.: 12/572,343

(22) Filed: Oct. 2, 2009

(65) Prior Publication Data
US 2010/0020010 A1   Jan. 28, 2010

(30) Foreign Application Priority Data
Oct. 6, 2008 (KR) .................. 10-2008-0097486

(51) Int. Cl.
*G09G 3/36* (2006.01)
*G02F 1/1335* (2006.01)

(52) U.S. Cl.
CPC .................................. *G02F 1/1336* (2013.01)

(58) Field of Classification Search
CPC .............. G09G 3/3406; G09G 2320/0646; G09G 3/36; G09G 3/3648; G09G 2360/16; G09G 3/3611; G09G 2320/064

USPC ........ 345/102, 163, 83, 173; 362/4–6, 29, 30, 362/559, 561; 40/124.02, 299.01
See application file for complete search history.

(56) References Cited

U.S. PATENT DOCUMENTS

| | | | |
|---|---|---|---|
| 6,690,362 B1* | 2/2004 | Motoyama et al. | 345/173 |
| 6,816,149 B1* | 11/2004 | Alsleben | 345/163 |
| 2006/0002448 A1* | 1/2006 | Parker | 374/102 |
| 2008/0037272 A1* | 2/2008 | Song et al. | 362/561 |
| 2008/0116420 A1* | 5/2008 | Zhang et al. | 252/301.4 F |

FOREIGN PATENT DOCUMENTS

| | | | | |
|---|---|---|---|---|
| DE | 100 11 109 A1 | * | 9/2001 | B29C 45/14 |
| JP | 2004-094039 | | 3/2004 | |
| WO | WO 93/21504 | * | 10/1993 | G01K 11/16 |

\* cited by examiner

*Primary Examiner* — Olga Merkoulova
(74) *Attorney, Agent, or Firm* — F. Chau & Associates, LLC

(57) ABSTRACT

A display device includes a light source unit generating light a display unit displaying an image using the light generated from the light source unit and a display part displaying a symbol, the display part disposed on the display unit, wherein the symbol is determined based on a type of the light source unit, a driving method of the light source unit or a luminance generated from the light source unit.

24 Claims, 9 Drawing Sheets

DISPLAY DEVICE

CROSS REFERENCE TO RELATED APPLICATION

This application claims priority under 35 U.S.C. §119 to Korean Patent Application No. 2008-97486, filed on Oct. 6, 2008, the contents of which are herein incorporated by reference in their entirety.

BACKGROUND OF THE INVENTION

1. Technical Field

The present disclosure relates to a display device, and more particularly, to a display device having a display part displaying a symbol representing a type of a light source unit.

2. Discussion of the Related Art

A liquid crystal display (LCD) device includes an LCD panel displaying an image using light transmissivity of liquid crystal and a backlight assembly disposed behind the LCD panel to provide light to the LCD panel.

The LCD panel includes an array substrate having pixel electrodes and thin-film transistors (TFTs) electrically connected to the pixel electrodes, a color filter substrate having a common electrode and color filters, and a liquid crystal layer interposed between the array substrate and the color filter substrate. An arrangement of the liquid crystal layer is changed by an electric field formed between the pixel electrodes and the common electrode. The arrangement of the liquid crystal layer determines the light transmissivity.

The backlight assembly includes a light source unit generating light and an optical member disposed on the light source unit. A cold cathode fluorescent lamp (CCFL) and a light-emitting diode (LED) can be used as the light source unit.

However, the light source unit disposed inside the display device is not visible from the outside. Accordingly, it is difficult to determine the type of light source unit that is mounted inside the display device without disassembling the display device.

SUMMARY OF THE INVENTION

Exemplary embodiments of the present invention provide a display device displaying a symbol representing a type of a light source unit.

According to an exemplary embodiment of the present invention, a display device comprises a light source unit generating light, a display unit displaying an image using the light generated from the light source unit, and a display part displaying a symbol, the display part disposed on the display unit, wherein the symbol is determined based on a type of the light source unit, a driving method of the light source unit or a luminance generated from the light source unit.

The display unit may comprise a display panel changing a light transmissivity of liquid crystal and an optical plate disposed on the display panel, wherein the display part is formed on the optical plate.

The display part may comprise an afterglow changing material emitting light based on external light projected onto the afterglow changing material.

The afterglow changing material not emitting the light when the external light is removed or heat applied from outside may have a temperature higher than a reference temperature, the afterglow changing material maintaining an afterglow for a predetermined time period when the heat may have a temperature lower than the reference temperature.

The display part may comprise a temperature color-changing material changing a color depending on an outside temperature.

The outside temperature can be changed based on the type of the light source unit.

The display part may comprise a selective transmitting material selectively transmitting light depending on a wavelength of the light generated from the light source unit when ultraviolet (UV) light is projected onto the display part.

The UV light can be generated from the light source unit.

The display part may comprise an invisible ink.

The invisible ink can be used when UV light is projected onto the display part, and the invisible ink can be transparent when a temperature is increased more than a reference temperature after the UV light is removed.

The temperature can be changed based on the type of the light source unit.

The display part may comprise a pattern, a display of the pattern being changed based on a viewing angle.

The display part may comprise a wavelength color-changing material, a color of light emitted from the wavelength color-changing material being changed based on a wavelength of UV light generated from the light source unit.

The display part may comprise a transparent electrode, an opposite electrode opposite to the transparent electrode, and an electro-transmitting unit comprising a semiconductor layer formed between the transparent electrode and the opposite electrode, wherein the electro-transmitting unit changes an absorption of light depending on a direction and intensity of an electric field formed between the transparent electrode and the opposite electrode.

The display part may comprise an electric color-changing unit displaying a first color, a second color and a third color based on a voltage applied to the electric color-changing unit.

The first color can be displayed when an electric field is not generated, the second color being different from the first color can be displayed when the electric field is generated in a first direction, and the third color being different from the first color and the second color can be displayed when the electric field is generated in a second direction different from the first direction.

Generation and the directions of the electric field formed between the electrodes can be determined by the luminance of the light generated from the light source unit.

The driving method may include a local dimming method wherein the symbol displayed on the display part is changed corresponding to a dimming duty of a local dimming signal.

According to an exemplary embodiment of the present invention, a display device comprises a light source unit generating light, a display unit displaying an image using the light generated from the light source unit, an outer case covering an edge of the display unit, and a display part displaying a symbol, the display part disposed on the outer case, wherein the symbol is determined based on a type of the light source unit, a driving method of the light source unit or a luminance generated from the light source unit.

The display part may comprise a temperature color-changing material changing a display color depending on an outside temperature.

The display part may comprise invisible ink.

The display part including the invisible ink can receive UV light, and the invisible ink can be transparent when a temperature is increased more than a reference temperature after that the UV light is removed.

The display part may comprise a pattern in which the symbol formed by the pattern is changed based on a viewing angle.

The display part may comprise a transparent electrode, an opposite electrode opposite to the transparent electrode, and an electro-transmitting unit comprising a semiconductor layer formed between the transparent electrode and the opposite electrode, wherein the electro-transmitting unit changes an absorption of light depending on a direction and intensity of an electric field formed between the transparent electrode and the opposite electrode.

The display part may comprise an electric color-changing unit displaying a first color, a second color and a third color based on an electric field generated in the electric color-changing unit.

The first color can be displayed when the electric field is not generated, the second color being different from the first color can be displayed when the electric field is generated in a first direction, the third color being different from the first color and the second color can be displayed when the electric field is generated in a second direction different from the first direction.

BRIEF DESCRIPTION OF THE DRAWINGS

Exemplary embodiments of the present invention can be understood in more detail from the following descriptions taken in conjunction with the accompanying drawings in which.

DETAILED DESCRIPTION OF EXEMPLARY EMBODIMENTS

The present invention is described more fully hereinafter with reference to the accompanying drawings, in which exemplary embodiments of the present invention are shown. The present invention may, however, be embodied in many different forms and should not be construed as limited to the exemplary embodiments set forth herein.

It will be understood that when an element or layer is referred to as being "on," "connected to" or "coupled to" another element or layer, it can be directly on, connected or coupled to the other element or layer or intervening elements or layers may be present.

Figure 1:
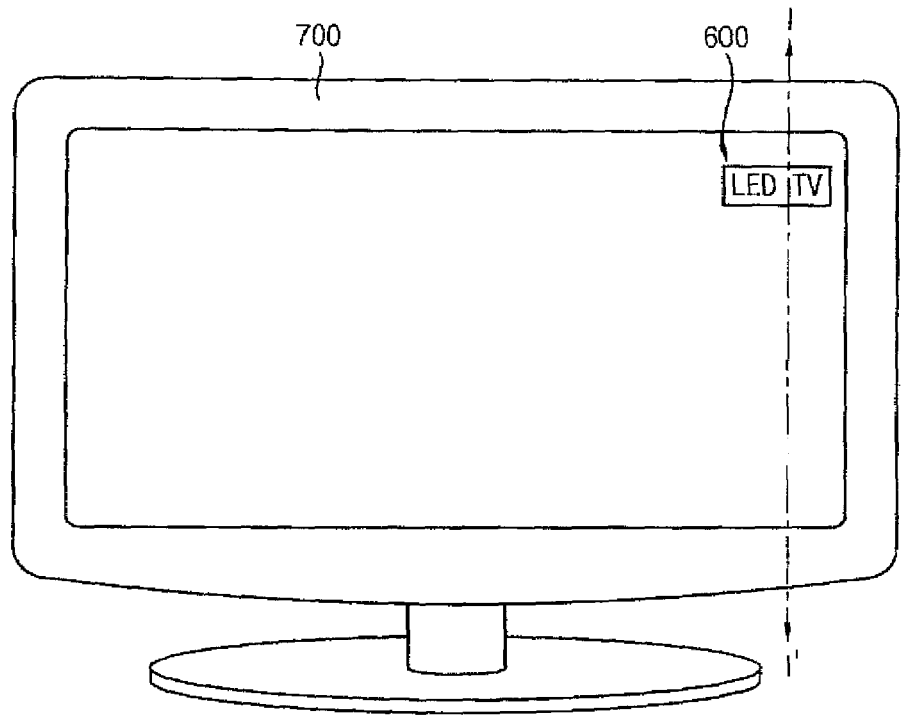
FIG. 1 is a front view illustrating a display device according to an exemplary embodiment of the present invention.
Figure 2:
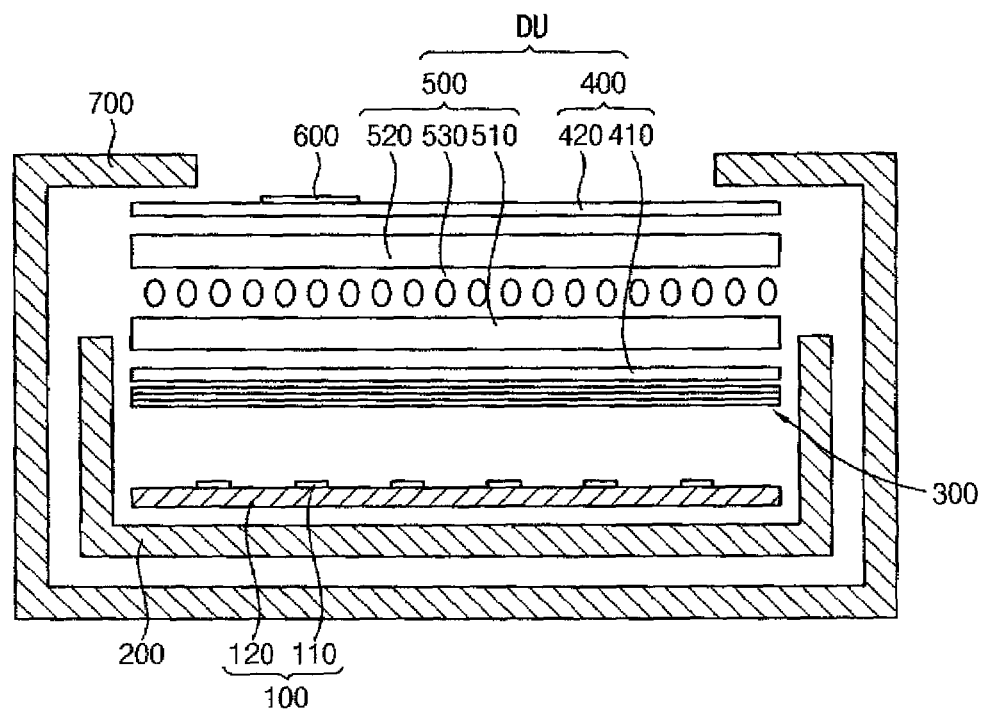
FIG. 2 is a cross-sectional view taken along the line I-I' of FIG. 1 according to an exemplary embodiment of the present invention.
Figure 3:
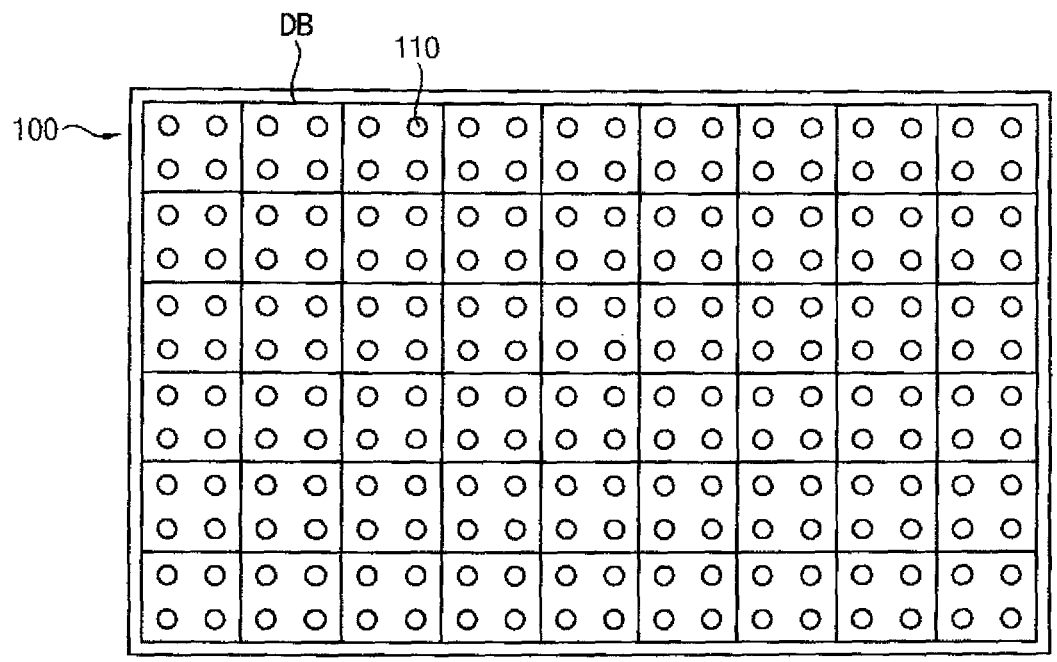
FIG. 3 is a plan view illustrating a light source unit of a display device according to an exemplary embodiment of the present invention.

FIG. 1 is a front view illustrating a display device according to an exemplary embodiment of the present invention. FIG. 2 is a cross-sectional view taken along the line I-I' of FIG. 1 according to an exemplary embodiment of the present invention. FIG. 3 is a plan view illustrating a light source unit of a display device according to an exemplary embodiment of the present invention.

Referring to FIGS. 1, 2 and 3, a display device includes a light source unit 100, a receiving container 200, an optical sheet 300, a display unit DU, a display part 600 and an outer case 700.

The light source unit 100 may include, for example, a plurality of cold cathode fluorescent lamps (CCFLs). In an exemplary embodiment, the light source unit 100 may include a plurality of light-emitting diodes (LEDs) 110 and a driving substrate 120 supplying power to the LEDs 100 disposed on the driving substrate 120.

The LEDs 110 may be arranged in a plurality of dimming blocks DB. Referring to FIG. 3, the dimming blocks DB are arranged in a 9×6 matrix according to an exemplary embodiment of the present invention. Each of the dimming blocks DB may be independently controlled. That is, the dimming blocks DB may be driven by a local dimming method. In an exemplary embodiment, the LEDs 110 may include a red LED, a green LED and a blue LED.

The receiving container 200 is disposed behind the light source unit 100 to contain, for example, the light source unit 100, the optical sheet 300, and the display unit DU. The receiving container 200 may be, for example, a bottom chassis having a high thermoconductivity. As a result, the receiving container 200 may dissipate heat generated in the light source unit 100.

The optical sheet 300 is disposed on the light source unit 100 to improve the quality of the light generated from the light source unit 100. For example, the optical sheet 300 may include a diffusion sheet increasing a uniformity of luminance and a prism sheet increasing a front luminance of light.

The display unit DU may include an optical plate 400 and a display panel 500. The optical plate 400 may include, for example, a first polarizing plate 410 and a second polarizing plate 420. The first polarizing plate 410 is disposed on the optical sheet 300 to polarize light in a first direction. The second polarizing plate 420 is disposed on the first polarizing plate 410 to polarize light in a second direction, which is perpendicular to the first direction.

The display panel 500 is disposed on the first and the second polarizing plates 410 and 420. The display panel 500 may include a first substrate 510 adjacent to the first polarizing plate 410, a second substrate 520 adjacent to the second polarizing plate 420, and a liquid crystal layer 530 interposed between the first substrate 510 and the second substrate 520.

The first substrate 510 may include a plurality of pixel electrodes and a thin-film transistor electrically connected to the pixel electrodes. The second substrate 520 may include a common electrode formed on the entire substrate and a plurality of color filters corresponding to the pixel electrodes. In an exemplary embodiment, an arrangement of the liquid crystal layer 530 is changed by an electric field formed between the pixel electrodes and the common electrode such that a transmissivity of the light transmitted through the liquid crystal layer 530 can be determined.

A symbol displayed by the display part 600 includes, for example, a letter, character, or number. For example, the symbol can be "LED TV". The symbol can be changed based on, for example, a type of the light source unit 100 or a condition of the light source unit 100. The condition can be, for example, a temperature of the light source unit 100. In an exemplary embodiment, the display part 600 may be disposed on, for example, an edge or a corner of the display unit DU, which is not covered by the outer case 700. As such, the display part 600 can be seen from the outside.

Referring to FIG. 2, the display part 600 may be formed on the second polarizing plate 420 according to an exemplary embodiment of the present invention. In exemplary embodiments, the display part 600 may be formed on the first polarizing plate 410, on the first substrate 510, on the second substrate 520, or on the optical sheet 300.

The outer case 700 accommodates the light source unit 100, the receiving container 200, the optical sheet 300, and the display unit DU. The outer case 700 exposes an image display area of the display unit DU.

Figure 4:
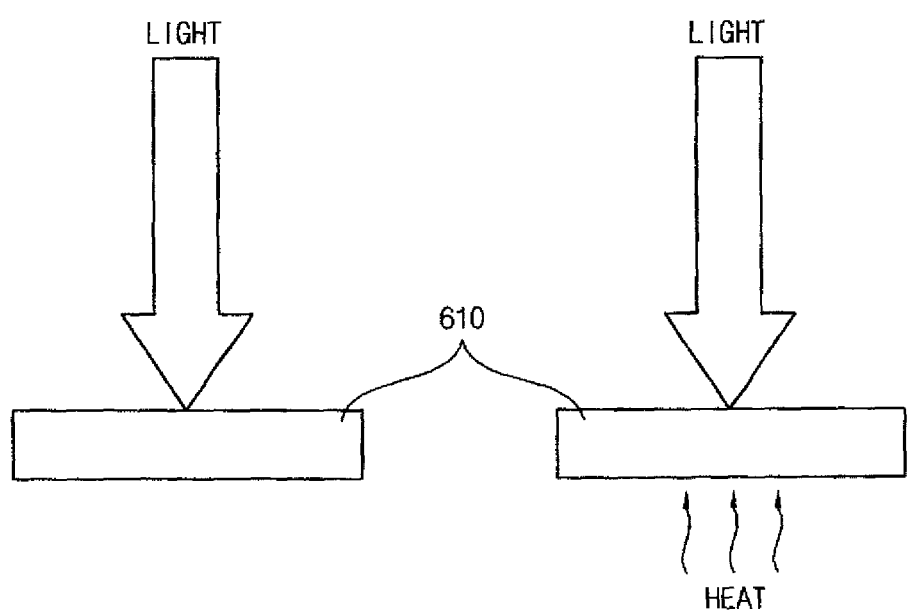
FIGS. 4 and 5 are cross-sectional views illustrating a display part of a display device according to an exemplary embodiment of the present invention.
Figure 5:
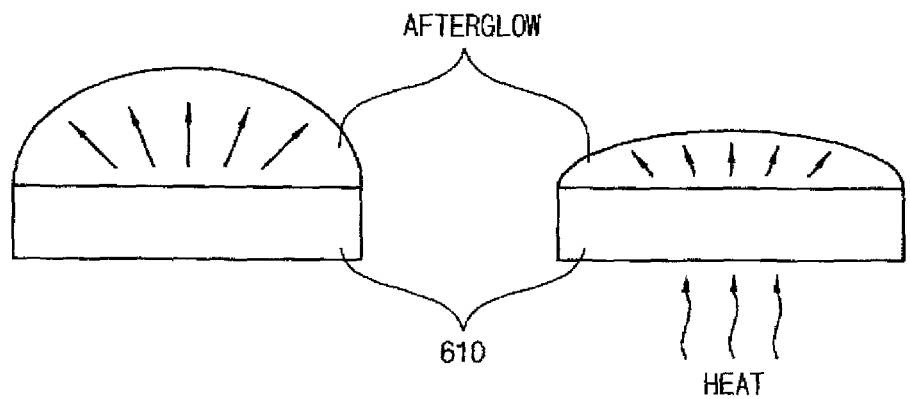

FIGS. 4 and 5 are cross-sectional views illustrating a display part of a display device according to an exemplary embodiment of the present invention. FIG. 4 shows that light is respectively projected onto a pair of display parts 610 including an afterglow changing material, and heat is applied to one of the display parts 610. FIG. 5 shows that the light is removed, and the heat is applied to one of the display parts 610.

Referring to FIGS. 4 and 5, the display part 610 may include an afterglow changing material.

Referring to FIGS. 4 and 5, the display part 610 including the afterglow changing material emits light when light is projected onto the display part. Referring to FIG. 5, the afterglow is generated when the light applied to the display part 610 including the afterglow changing material is removed. When the heat applied to the afterglow changing material is less than a reference temperature, that is, the afterglow changing material is at a room temperature or slightly higher temperature than the room temperature, the afterglow generated from the afterglow changing material remains for a predetermined time. When the heat applied to the afterglow changing material has a temperature higher than the reference temperature, that is, the afterglow changing material is at a substantially higher temperature than the room temperature, the afterglow generated from the afterglow changing material is removed in less time than the predetermined time.

The afterglow changing material may include, for example, at least one of a zinc sulfide/silver compound (ZnS:Ag), a zinc sulfide/cadmium sulfide/copper compound (ZnS.CdS:Cu) or a zinc silicon/copper compound (ZnSi:Cu).

In an exemplary embodiment, a temperature of the display part 600 may depend on the type of the light source unit 100.

When the light source unit 100 is the CCFL, about 83% of the energy of the CCFL changes into infrared (IR) light. The IR light generated from the CCFL is transmitted to the display unit DU. A temperature of the display part 600 receiving the IR light can be increased.

When the light source unit 100 is the LED driven by a local dimming method, about 85% of the energy of the LED changes into heat. The heat generated from the LED dissipates to the receiving container 200, a bottom chassis, through the driving substrate 120. As a result, the heat generated from the LED is not transmitted to the display unit DU and a temperature of the display signal part 600 does not increase.

A temperature of the display part 600 is higher when the light source unit 100 is the CCFL than when the light source unit 100 is the LED. Accordingly, when the display part 610 includes the afterglow changing material and the light source unit 100 is the LED, the afterglow generated from the afterglow changing material remains for a longer time as compared when the light source unit 100 is the CCFL.

According to an exemplary embodiment, when the display part 610 includes the afterglow changing material, the type of the light source unit 100 can be determined from the remaining time of the afterglow.

Figure 6:
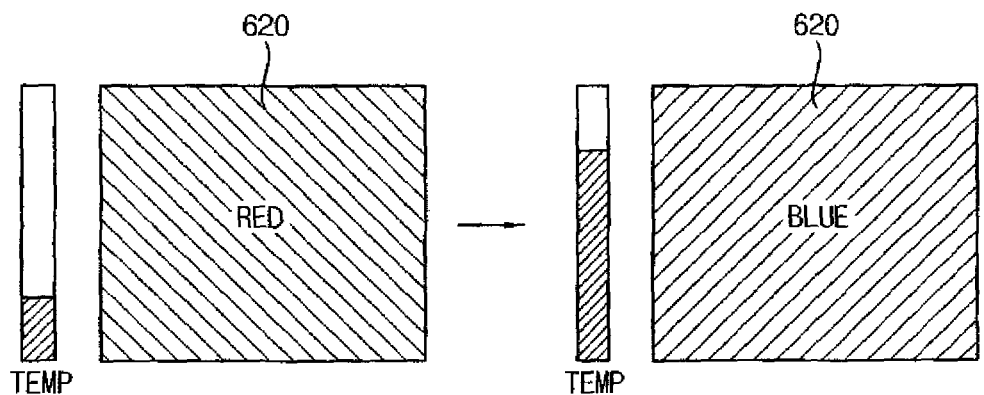
FIG. 6 is a plan view illustrating a display part of a display device according to an exemplary embodiment of the present invention.

FIG. 6 is a plan view illustrating a display part of a display device according to an exemplary embodiment of the present invention.

Referring to FIGS. 1, 2 and 6, a display part 620 includes a temperature color-changing material changing a display color depending on an outside temperature.

In an exemplary embodiment, the display part 620 comprising the temperature color-changing material may represent red color at a low temperature. In an exemplary embodiment, the display part 620 comprising the temperature color-changing material may represent blue color at a high temperature. The temperature color-changing material may include cholesteric liquid crystal in which the color is changed based on a temperature due to thermochromic effects.

In an exemplary embodiment, the outside temperature may be changed based on the type of the light source unit 100.

A temperature of the display part 620 is higher when the light source unit 100 is the CCFL than when the light source unit 100 is the LED. Accordingly, when the light source unit 100 is the CCFL, the color-changing material may represent blue color. When the light source unit 100 is the LED, the color-changing material may represent red color.

According to an exemplary embodiment of the present invention, when the display part 620 includes the color-changing material, the type of the light source unit 100 can be determined from how the color-changing material changes color.

Figure 7:
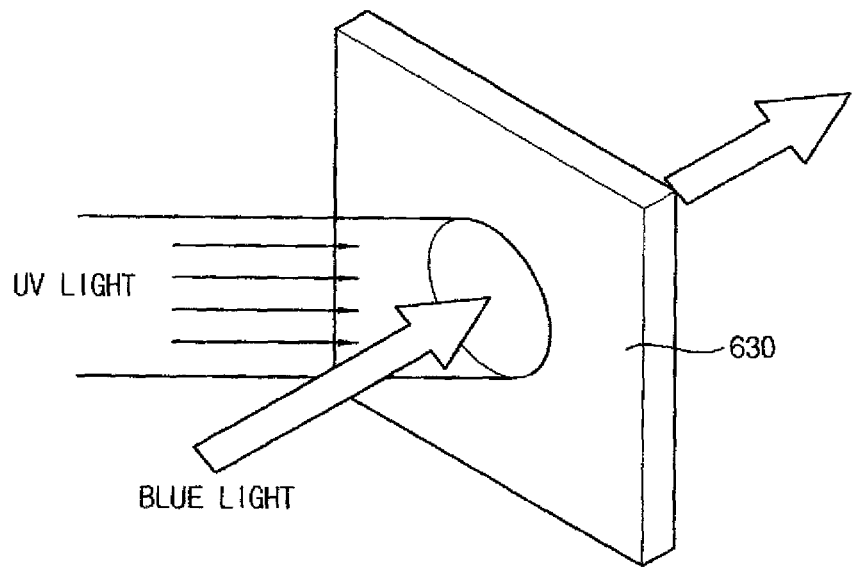
FIGS. 7 and 8 are perspective views illustrating a display part of a display device according to an exemplary embodiment of the present invention.
Figure 8:
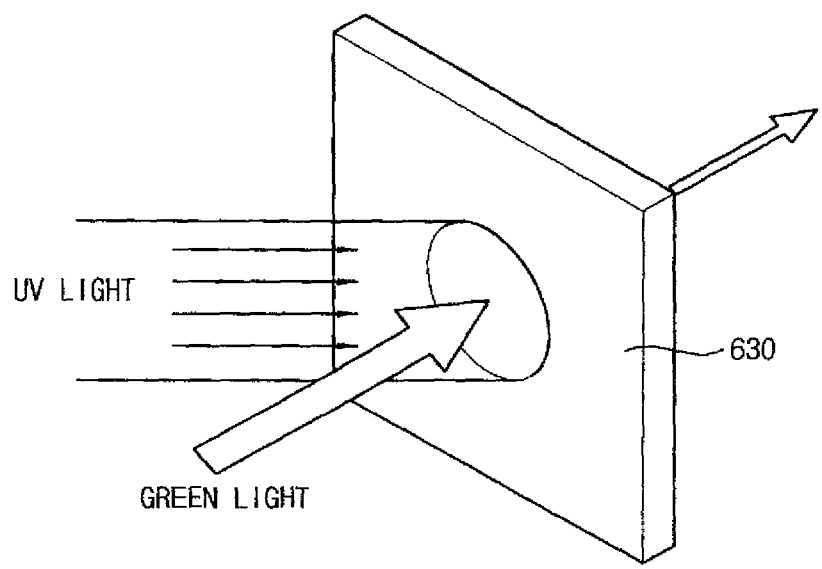

FIGS. 7 and 8 are perspective views illustrating a display part of a display device according to an exemplary embodiment of the present invention. Referring to FIG. 7, light of a blue wavelength is projected to the display part 630 while the ultraviolet (UV) light is projected onto the display part 630. Referring to FIG. 8, light of a green wavelength is projected to the display part 630 while the UV light is projected onto the display part 630.

Referring to FIGS. 1, 2, 7 and 8, the display part 630 includes a selective transmitting material. The selective transmitting material can selectively transmit or absorb light based on a wavelength of the light generated from the light source unit 100 when the UV light is projected onto the display part 630.

The selective transmitting material transmits the light of a blue wavelength when the display part 630 receives the UV light. The selective transmitting material absorbs the light of a green wavelength to block the light when the display part 630 receives the UV light. For example, the selective transmitting material may include a photochromic material. The photochromic material transmits the light of a blue wavelength when the photochromatic material receives the UV light. The photochromic material absorbs the light of a red wavelength when the photochromatic material receives the UV light.

In an exemplary embodiment, the UV light may be generated based on the type of the light source unit 100. For example, when the light source unit 100 is the CCFL, an amount of the UV light generated from the light source unit 100 may be small. When the light source unit 100 is the LED, an amount of the UV light generated from the light source unit 100 may be large. This is because the LED can generate the light of a blue wavelength and the light in a UV range.

Accordingly, the UV light may be generated based on the type of the light source unit 100, and light of the blue wavelength generated from the light source unit 100 may be transmitted depending on the existence of the UV light.

An amount of light of the blue wavelength that is close to the UV light may be changed based on the light source unit 100. For example, the amount of light of the blue wavelength that is close to the UV light when the light source unit 100 is LEDs may be greater than an amount of light of the blue wavelength that is close to the UV light when the light source unit 100 is the CCFL.

Accordingly, the amount of light of the blue wavelength that is close to the UV light may depend on the type of the light source unit 100, and an amount of light transmitted through the selective transmitting material may depend on the amount of light of the blue wavelength that is close to the UV light.

According to an exemplary embodiment of the present invention, when the display part 630 includes the selective transmitting material, the type of the light source unit 100 can be determined from whether the light from the light source unit 100 is transmitted through the selective transmitting material or not and the amount of light transmitted through the selective transmitting material.

Figure 9:
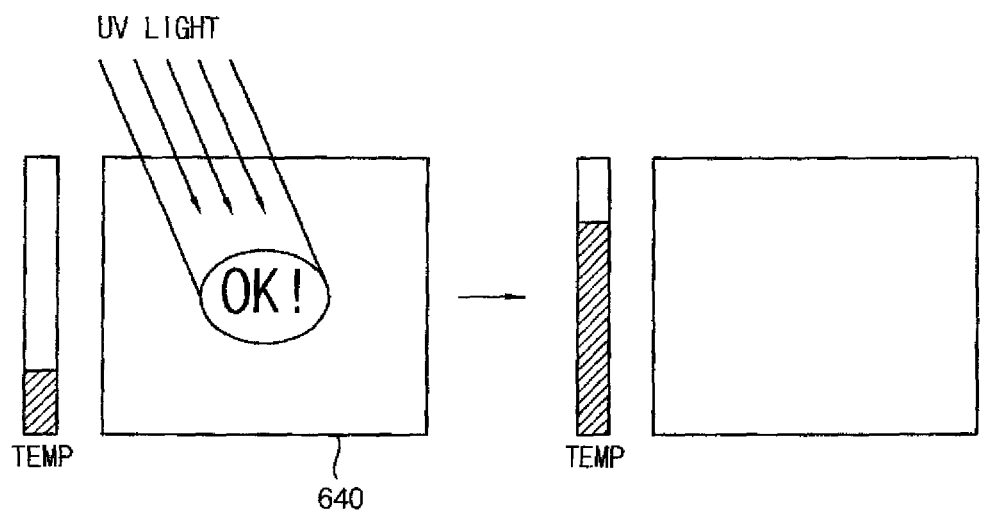
FIG. 9 is a plan view illustrating a display part of a display device according to an exemplary embodiment of the present invention.

FIG. 9 is a plan view illustrating a display part of a display device according to an exemplary embodiment of the present invention.

Referring to FIGS. 1, 2 and 9, the display part 640 includes invisible ink. The invisible ink may include a light-transmitting polymer.

The invisible ink is utilized on the first polarizing plate 420 when the UV light is projected onto the display 640 part. After the UV light is removed, when a temperature surrounding the invisible ink is increased more than a reference temperature, the invisible ink becomes transparent. In an exemplary embodiment, the reference temperature may be about 60° C.

The temperature surrounding the invisible ink may be changed based on the type of the light source unit 100.

The temperature of the display part 640 is higher when the light source unit 100 is the CCFL than when the light source unit 100 is the LED. Accordingly, when the light source unit 100 is the LED, the invisible ink becomes opaque. Thus, a symbol such as "OK!" can be displayed on the display part 640. When the light source unit 100 is the CCFL, the invisible ink becomes transparent. Thus, no symbol is displayed on the display part 640.

When the display part 640 includes the invisible ink, the type of the light source unit 100 can be determined based on whether the invisible ink is transparent or opaque.

Figure 10:
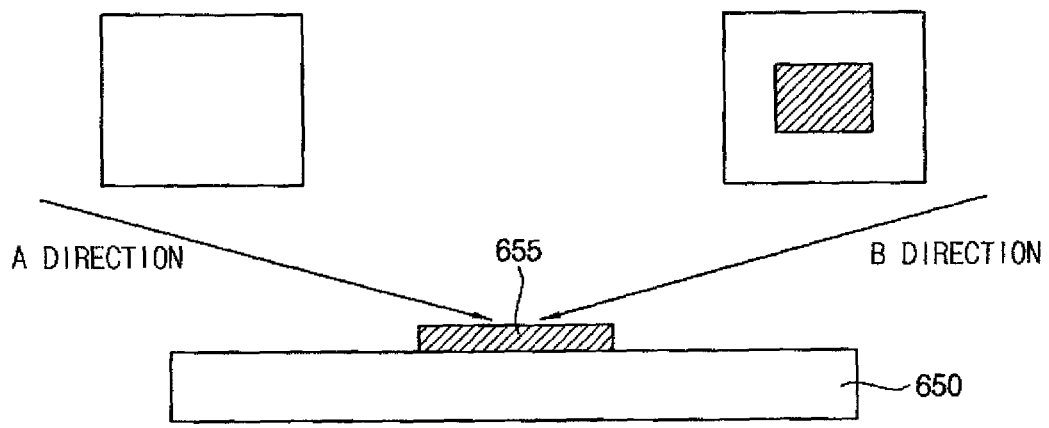
FIG. 10 is a cross-sectional view illustrating a display signal part of a display device according to an exemplary embodiment of the present invention.

FIG. 10 is a cross-sectional view illustrating a display part of a display device according to an exemplary embodiment of the present invention.

Referring to FIGS. 1, 2 and 10, the display part 650 includes a pattern 655 such that a display of a symbol is changed based on a viewing angle. The pattern 655 can be disposed, for example, on the display part 650 or on the second polarizing part 420.

For example, referring to FIG. 10, the pattern 655 is not visible in the A direction, and the pattern 655 is visible in the B direction. In an exemplary embodiment, the pattern 655 is not visible in the A direction because the display part 650 is brighter than the pattern 655, and the pattern 655 is visible in the B direction because the pattern 655 is brighter than the display part 650. The B direction can be substantially identical to the direction of projected light, and the A direction may be substantially opposite to the direction of the projected light.

Accordingly, the pattern 655 may control a display of a symbol based on a type of the light source unit 100. For example, when the light source unit 100 is an LED, the pattern 655 can be attached on the second polarizing plate 420. The pattern 655 can be seen from the outside in a predetermined viewing angle.

When the display part 650 includes the pattern 655, the type of the light source unit 100 can be determined based on whether a symbol is displayed or not or based on a display angle of the pattern 655.

Figure 11:
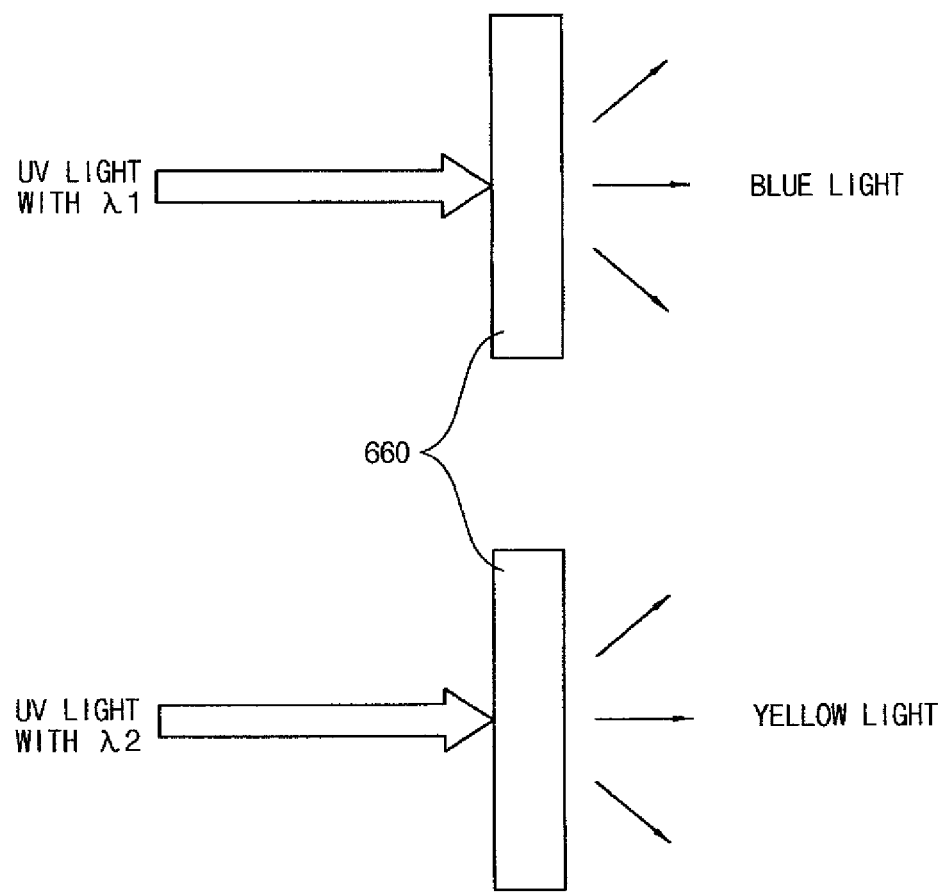
FIG. 11 is a cross-sectional view illustrating a display part of a display device according to an exemplary embodiment of the present invention.

FIG. 11 is a cross-sectional view illustrating a display part of a display device according to an exemplary embodiment of the present invention.

Referring to FIGS. 1, 2 and 11, the display part 660 may include a wavelength color-changing material. A color of light emitted from the wavelength color-changing material is determined based on the wavelength of UV light generated from the light source unit 100. The wavelength color-changing material may include a fluorescent pigment generating an afterglow by the UV light.

For example, the wavelength color-changing material may represent a blue color when the UV light has a first wavelength $\lambda 1$, and the wavelength color-changing material may represent a yellow color when the UV light has a second wavelength $\lambda 2$ different from the first wavelength $\lambda 1$.

In an exemplary embodiment, the wavelength of the UV light may be changed based on the type of the light source unit 100. For example, when the light source unit 100 is the CCFL, the UV light having the first wavelength $\lambda 1$ may be generated. When the light source unit 100 is the LED, the UV light having the second wavelength $\lambda 2$ may be generated. In an exemplary embodiment, when the light source unit 100 is the CCFL, little or no UV light may be generated. When the light source unit 100 is the LED, UV light may be generated. Accordingly, the type of the light source unit 100 determines a color of light emitted from the color-changing material. The type of the light source unit 100 can also determine whether or not the color-changing material emits light.

According to an exemplary embodiment, when the display part 660 includes the wavelength color-changing material, the type of the light source unit 100 can be determined from a color of light emitted or a light emission of the wavelength color-changing material.

Figure 12:
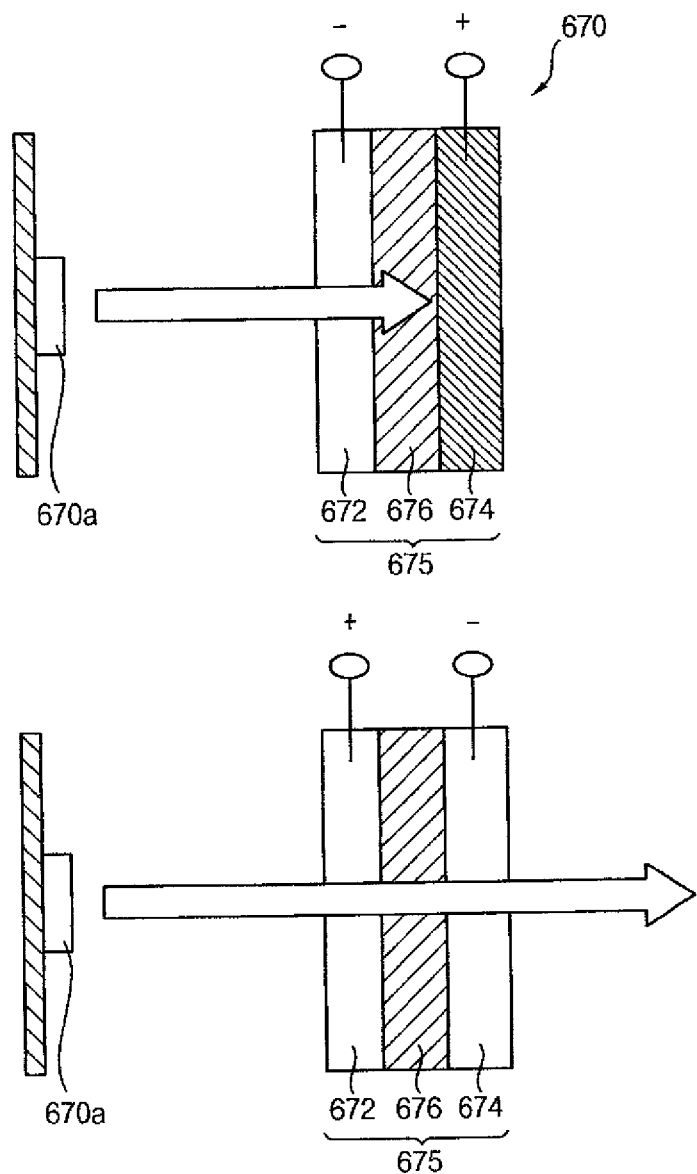
FIG. 12 is a cross-sectional view illustrating a display part of a display device according to an exemplary embodiment of the present invention.

FIG. 12 is a cross-sectional view illustrating a display signal part of a display device according to an exemplary embodiment of the present invention.

Referring to FIGS. 1, 2, and 12, the display part 670 includes an electro-transmitting unit 675. The electro-transmitting unit 675 selectively absorbs or transmits light emitted from a light source 670*a*.

The electro-transmitting unit 675 may include a transparent electrode 672, an opposite electrode 674 opposite to the transparent electrode 672 and a semiconductor layer 676 formed between the transparent electrode 672 and the opposite electrode 674. For example, the opposite electrode 674 may include an electrochromic material. In the electrochromic material, light is changed when an electric field or an electric current is applied because a color absorbing range is generated.

The amount of absorbed light from the electro-transmitting unit 675 is determined based on a direction and intensity of an electric field formed between the transparent electrode 672 and the opposite electrode 674. For example, when a cathode voltage is applied to the transparent electrode 672, and an anode voltage is applied to the opposite electrode 674, light applied to the transparent electrode 672 is absorbed by the opposite electrode 674 to block the light. The opposite electrode 674 may be changed to an opaque color. When an anode voltage is applied to the transparent electrode 672, and a cathode voltage is applied to the opposite electrode 674, light applied to the transparent electrode 672 is transmitted through the opposite electrode 674. An amount of light transmitted or absorbed through the electro-transmitting unit 670 is determined based on the strength of an electric field formed between the transparent electrode 672 and the opposite electrode 674.

The direction and the strength of the electric field formed between the transparent electrode 672 and the opposite electrode 674 may be determined based on a change of a luminance generated from the light source unit 100. The change of the luminance can be caused by a driving signal driving the light source unit 100. For example, when the light source unit 100 includes LEDs arranged on a plurality of dimming blocks DB to be driven by the local dimming method, the direction of the electric field may be determined based on a dimming duty of a local dimming signal for driving the dimming blocks DB.

For example, when the dimming duty is more than about 50%, the anode voltage may be applied to the transparent electrode 672, and the cathode voltage may be applied to the opposite electrode 674. When the dimming duty is less than about 50%, the cathode voltage may be applied to the transparent electrode 672, and the anode voltage may be applied to the opposite electrode 674. As a result, the light may be transmitted or not transmitted in the electro-transmitting unit 675 depending on the dimming duty of the local dimming signal.

Accordingly, when the light source unit 100 is the LED driven by the local dimming method, the symbol of the display part 670 may blink when the electro-transmitting unit 675 is disposed in the display unit DU.

According to an exemplary embodiment, when the display part 670 includes the electro-transmitting unit 675, the type of the light source unit 100 can be determined from whether a light is emitted by the electro-transmitting unit 675 or not.

Figure 13:
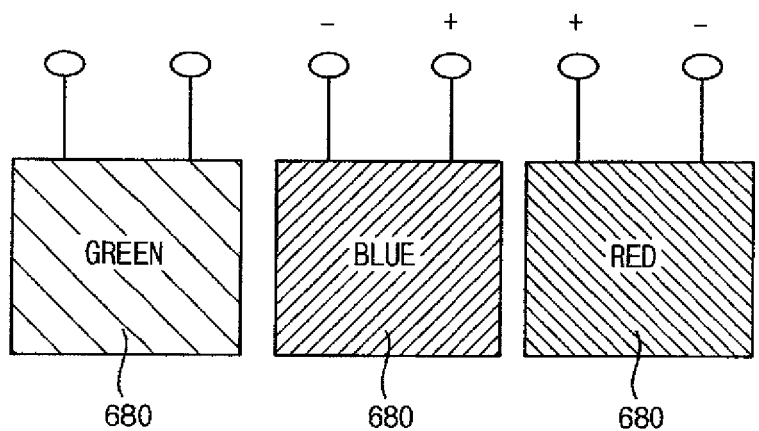
FIG. 13 is a plan view illustrating a display part of a display device according to an exemplary embodiment of the present invention

FIG. 13 is a plan view illustrating a display part of a display device according to an exemplary embodiment of the present invention.

Referring to FIGS. 1, 2 and 13, the display signal part 680 includes an electric color-changing unit in which a color may be changed based on the electric field formed between two electrodes. For example, the electric color-changing unit may include a lutecium diphthalocyanine film.

The electric color-changing unit may have a first color when a voltage is not applied to the two electrodes such that no electric filed is generated in the electric color-changing unit. The electric color-changing unit may have a second color different from the first color when the voltage is applied to the two electrodes in a first sequence (e.g., − and +) such that an electric filed is generated in a first direction. The electric color-changing unit may have a third color different from the first and the second colors when the voltage is applied to the two electrodes in a second sequence (e.g., + and −) such that an electric filed is generated in a second direction opposite to the first direction.

In an exemplary embodiment, the existence and the direction of an electric field formed between the two electrodes of the electric color-changing unit may be changed based on a luminance generated from the light source unit 100, that is, a driving signal driving the light source unit 100. For example, when the light source unit 100 is LEDs arranged into a plurality of the dimming blocks DB to be driven by the local dimming method, the existence and the direction of the electric field may be determined based on the dimming duty of the local dimming signal for driving the dimming block DB or whether the power is applied to the dimming blocks or not. When a voltage is not applied to both of the electrodes of the electric color-changing unit, the electric color-changing unit may have a green color. When the dimming duty of the local dimming signal is more than about 50%, an electric field is formed in the electric color-changing unit in the first direction. As a result, the electric color-changing unit may have a red color. When the dimming duty of the local dimming signal is less than about 50%, an electric field is formed in the electric color-changing unit in the second direction. As a result, the electric color-changing unit may have a blue color.

Accordingly, when the light source unit 100 is an LED driven by the local dimming method, a color of the display signal part 680 may be changed based on the dimming duty of the local dimming signal when the electric color-changing unit is disposed in the display unit DU.

According to an exemplary embodiment when the display signal part 680 includes the electric color-changing unit, the type of the light source unit 100 can be determined from the changing of the color of the electric color-changing unit 680.

Figure 14:
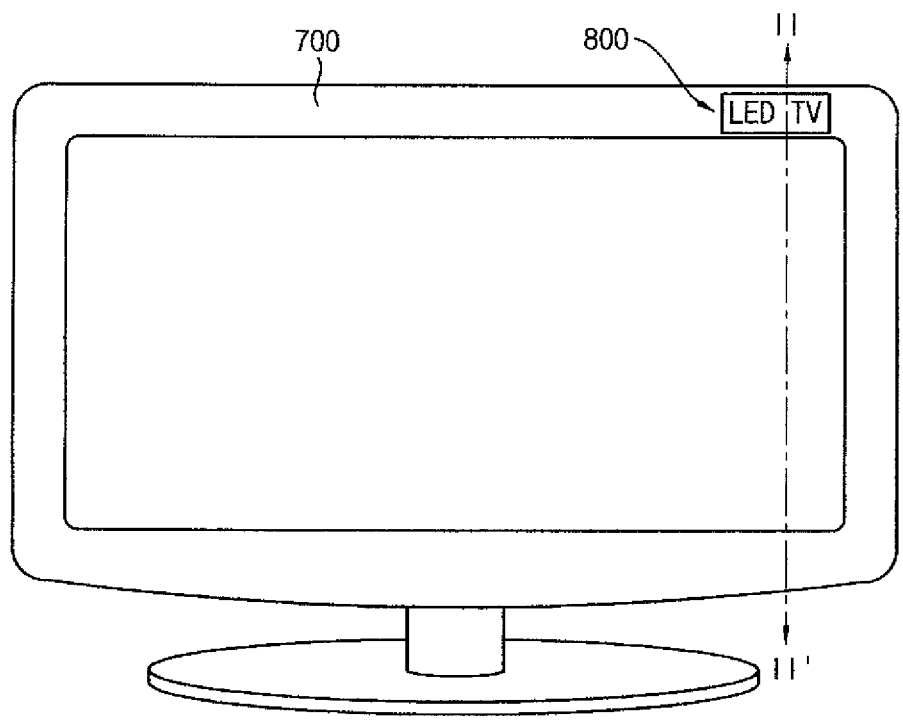
FIG. 14 is a front view illustrating a display device according to an exemplary embodiment of the present invention.
Figure 15:
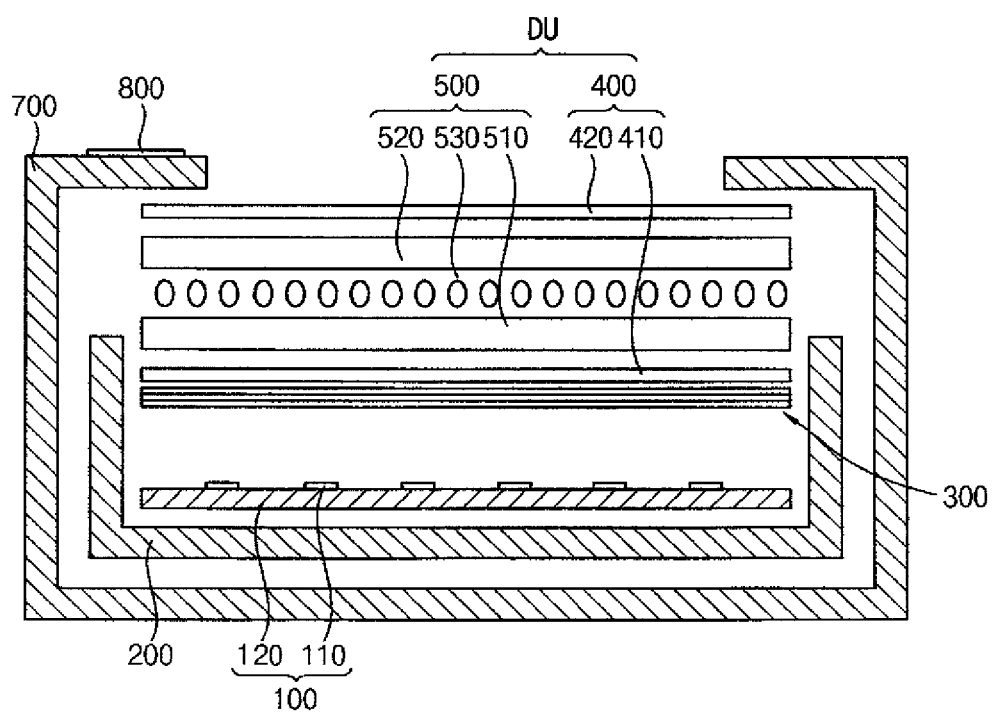
FIG. 15 is a cross-sectional view taken along the line II-II' of FIG. 14 according to an exemplary embodiment of the present invention.

FIG. 14 is a front view illustrating a display device according to an exemplary embodiment of the present invention. FIG. 15 is a cross-sectional view taken along the line II-II' of FIG. 14 according to an exemplary embodiment of the present invention.

Referring to FIGS. 14 and 15, a display part 800 may be attached on the outer case 700. For example, the display part 800 may be attached on an edge of the outer case 700.

The temperature of the display part 800 which is substantially the same as the temperature of upper portion of the outer case 700 may be changed based on the type of the light source unit 100. For example, when the light source unit 100 is the CCFLs, about 83% of the energy of the CCFL is consumed by IR light. The IR light generated from the CCFL is transmitted to the upper portion of the outer case 700 to increase a temperature in the display part 800. When the light source unit 100 is an LED driven by the local dimming method, about 85% of the energy of the LED is consumed by heat. The heat generated from the LED is emitted to the receiving container 200, a bottom chassis, through the driving substrate 120. Thus, the temperature of the display part 800 is not increased.

As a result, a temperature of the display part 800 is higher when the light source unit 100 is the CCFL than when the light source unit 100 is the LED.

Accordingly, in an exemplary embodiment, a symbol on the display part 800 can be determined based on a surrounding temperature. For example, the display part 800 may include at least one of the temperature color-changing material, the invisible ink or the pattern as described in connection with FIGS. 1, 2, 6, 9 and 10.

When the light source unit 100 is an LED driven by the local dimming method, a symbol displayed on the display part 800 may be changed corresponding to the dimming duty of the local dimming signal. For example, the display part 800 may include at least one of the electro-transmitting unit and the light source 670*a*, and the electric color-changing unit.

According to an exemplary embodiment, the type of the light source unit 100 can be determined using the display part 800 attached on an upper portion of the outer case 700 when a symbol displayed on the display part 800 changes depending on the type of the light source unit 100.

In an exemplary embodiment, the display part 600, 610-680, and 800 may be applied to a symbol representing a logo of a company.

According an exemplary embodiment of the present invention, a symbol displayed on the display part disposed on the display unit or the outer case may be changed based on the type of the light source unit, a driving of the light source unit and a luminance generated from the light source unit. Accordingly, the type of the light source unit can be determined from the symbol displayed on the display part.

When the display part is disposed in the display unit or the outer case, an imitation of the display device can be prevented using the display part which can be changed based on a type of the light source unit.

Although exemplary embodiments of the present invention have been described herein with reference to the accompanying drawings, it is to be understood that the present invention should not be limited thereto and that various other changes and modifications may be affected therein by one of ordinary skill in the related art without departing from the scope or spirit of the invention. All such changes and modifications are intended to be included within the scope of the invention.

What is claimed is:

1. A display device comprising: a light source unit generating light; a display unit displaying an image using the light generated from the light source unit; and a display part displaying a symbol, the display part disposed on the display unit, wherein the symbol is determined based on a type of the light source unit, a driving method of the light source unit or a luminance generated from the light source unit, wherein the display unit comprises: a display panel changing a light transmissivity of liquid crystal; and an optical plate disposed on the display panel, the optical plate including first and second polarizing plates, wherein the display part is formed directly on the second polarizing plate of the optical plate,
wherein the display part comprises an afterglow changing material emitting light based on external light projected onto the afterglow changing material,
and wherein the afterglow changing material not emitting the light when the external light is removed or heat applied from outside has a temperature higher than a reference temperature, the afterglow changing material maintaining an afterglow for a predetermined time period when the heat has a temperature lower than the reference temperature.

2. The display device of claim 1, wherein the display part comprises a temperature color-changing material changing a color depending on an outside temperature.

3. The display device of claim 2, wherein the outside temperature is changed based on the type of the light source unit.

4. The display device of claim 1, wherein the display part comprises a selective transmitting material selectively transmitting light depending on a wavelength of the light generated from the light source unit when ultraviolet (UV) light is projected onto the display part.

5. The display device of claim 4, wherein the UV light is generated from the light source unit.

6. The display device of claim 1, wherein the display part comprises an invisible ink.

7. The display device of claim 6, wherein the invisible ink is used when UV light is projected onto the display part and the invisible ink is transparent when a temperature is increased more than a reference temperature after the UV light is removed.

8. The display device of claim 7, wherein the temperature is changed based on the type of the light source unit.

9. The display device of claim 1, wherein the display part comprises a pattern, a display of the pattern being changed based on a viewing angle.

10. The display device of claim 1, wherein the display part comprises a wavelength color-changing material, a color of light emitted from the wavelength color-changing material being changed based on a wavelength of UV light generated from the light source unit.

11. The display device of claim 1, wherein the display part comprises:
a transparent electrode;
an opposite electrode opposite to the transparent electrode; and
an electro-transmitting unit comprising a semiconductor layer formed between the transparent electrode and the opposite electrode,
wherein the electro-transmitting unit changes an absorption of light depending on a direction and intensity of an electric field formed between the transparent electrode and the opposite electrode.

12. The display device of claim 1, wherein the display part comprises an electric color-changing unit displaying a first color, a second color and a third color based on a voltage applied to the electric color-changing unit.

13. The display device of claim 12, wherein the first color is displayed when an electric field is not generated, the second color being different from the first color is displayed when the electric field is generated in a first direction, and the third color being different from the first color and the second color is displayed when the electric field is generated in a second direction different from the first direction.

14. The display device of claim 13, wherein generation and the directions of the electric field formed between the electrodes is determined by the luminance of the light generated from the light source unit.

15. The display device of claim 1, wherein the driving method includes a local dimming method wherein the symbol displayed on the display part is changed corresponding to a dimming duty of a local dimming signal.

16. A display device comprising: a light source unit generating light; a display unit displaying an image using the light generated from the light source unit; an outer case covering an edge of the display unit; and a display part displaying a symbol, the display part disposed on-outside the outer case, wherein the symbol is determined based on a type of the light source unit, a driving method of the light source unit or a luminance generated from the light source unit, wherein the display part comprises a temperature color-changing material changing a display color depending on an outside temperature.

17. The display device of claim 16, wherein the display part comprises invisible ink.

18. The display device of claim 17, wherein the display part including the invisible ink receives UV light, and the invisible ink is transparent when a temperature is increased more than a reference temperature after that the UV light is removed.

19. The display device of claim 16, wherein the display part comprises a pattern in which the symbol formed by the pattern is changed based on a viewing angle.

20. The display device of claim 16, wherein the display part comprises:
- a transparent electrode;
- an opposite electrode opposite to the transparent electrode; and
- an electro-transmitting unit comprising a semiconductor layer formed between the transparent electrode and the opposite electrode,
- wherein the electro-transmitting unit changes an absorption of light depending on a direction and intensity of an electric field formed between the transparent electrode and the opposite electrode.

21. The display device of claim 16, wherein the display part comprises an electric color-changing unit displaying a first color, a second color and a third color based on an electric field generated in the electric color-changing unit.

22. The display device of claim 21, wherein the first color is displayed when the electric field is not generated, the second color being different from the first color is displayed when the electric field is generated in a first direction, the third color being different from the first color and the second color is displayed when the electric field is generated in a second direction different from the first direction.

23. The display device of claim 11, wherein the transparent electrode, the semiconductor layer, and the opposite electrode overlap each other.

24. The display device of claim 20, wherein the transparent electrode, the semiconductor layer, and the opposite electrode overlap each other.

\* \* \* \* \*